(12) United States Patent
Hernacki (10) Patent No.: US 7,617,533 B1
(45) Date of Patent: Nov. 10, 2009

(54) SELF-QUARANTINING NETWORK

(75) Inventor: Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 887 days.

(21) Appl. No.: 11/047,381

(22) Filed: Jan. 31, 2005

(51) Int. Cl.
*G06F 11/00* (2006.01)
(52) U.S. Cl. .......................................... 726/22; 726/23
(58) Field of Classification Search ............. 726/3, 726/11–15, 22–25; 709/224–225; 713/188
See application file for complete search history.

(56) References Cited

U.S. PATENT DOCUMENTS

| | | | | |
|---|---|---|---|---|
| 6,324,656 | B1 * | 11/2001 | Gleichauf et al. | 714/37 |
| 7,398,389 | B2 * | 7/2008 | Teal et al. | 713/164 |
| 2003/0023876 | A1 * | 1/2003 | Bardsley et al. | 713/201 |

OTHER PUBLICATIONS

Wong, Wang, Song, Bielski, Ganger: *Dynamic Quarantine of Internet Worms*; Carnegie Mellon University: The International Conference on Dependable Systems and Networks (DSN-2004). Palazzo dei Congressi, Florence, Italy, Jun. 28-Jul. 1, 2004.
Microsoft Corporation: *Microsoft Windows Server 2003 Network Access Quarantine Control*: Published Mar. 2003, Updated Oct. 2003.
Cisco Systems, Inc. *Cisco Network Admission Control*: © 2004.
Moore et al., "Internet Quarantine: Requirements for Containing Self-Propagating Code", University of California, San Diego. IEEE, Mar. 30-Apr. 3, 2003, vol. 3, pp. 1901-1910.

* cited by examiner

*Primary Examiner*—Hosuk Song
(74) *Attorney, Agent, or Firm*—Hunton & Williams LLP (57) ABSTRACT

Mitigating network security threats through a self-quarantining network is disclosed. Traffic received from a local source via a physical port is monitored. If a threat is detected, traffic associated with the physical port is restricted. In some embodiments, the monitoring includes one or more of performing a signature check on the traffic, applying statistical analysis to the traffic, performing protocol analysis on the traffic, and aggregating information about the traffic with information about traffic from an outside source.

33 Claims, 9 Drawing Sheets

SELF-QUARANTINING NETWORK

FIELD OF THE INVENTION

The present invention relates generally to network security. More specifically, a self-quarantining network is disclosed.

BACKGROUND OF THE INVENTION

Some network security threats, such as worms, viruses, and "stepping stone" attacks (hereinafter "spreading threats"), "spread" to other systems through a common network. Spreading threats first compromise a host, through a variety of means, and then proceed to attempt further compromise of other hosts that can be reached over a connected network. In many networks, once one or a small number of hosts are compromised, they can adversely affect the network despite existing security measures. For example, a compromised host may be able to subvert a trust relationship not accessible to the original attack host. Compromised hosts can also generate a denial of service effect, in some cases merely by attempting to spread, even to non-vulnerable hosts.

Quarantine is a general technique used to help mitigate these situations. Hosts that are determined to be infected are isolated from the other hosts to prevent further infection. The infected hosts are then "cured" (cleaned, reloaded, etc.) and returned to the general population. This technique is often implemented in an extremely manual way. First, a host or network is determined to be infected. This is typically accomplished by having a human review firewall, IDS, or antivirus logs, and estimate which hosts are infected by what. Next, the infected population is detached from the network, often through physical means, such as power-offs or removing network cables. This approach is slow, error prone, labor intensive, and not likely to work without constant, and sometimes considerable, human staffing. The existing non-labor-intensive techniques for detecting and mitigating spreading threats require significant time, effort, and expertise to respond to new threats and are often very disruptive to other components of network and security infrastructure. Therefore, it would be desirable to have a better way to neutralize spreading threats.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-quarantining network is disclosed. In one embodiment, network security threats are mitigated by monitoring traffic received from a local source via a physical port and automatically restricting traffic associated with the physical port if a threat is detected. In some embodiments, when a spreading threat is detected, a decision is made based on the nature and scope of the threat. This decision determines which, if any, physical ports to isolate, and whether to isolate all traffic, or specific types of traffic to and from those physical ports.

Figure 1:
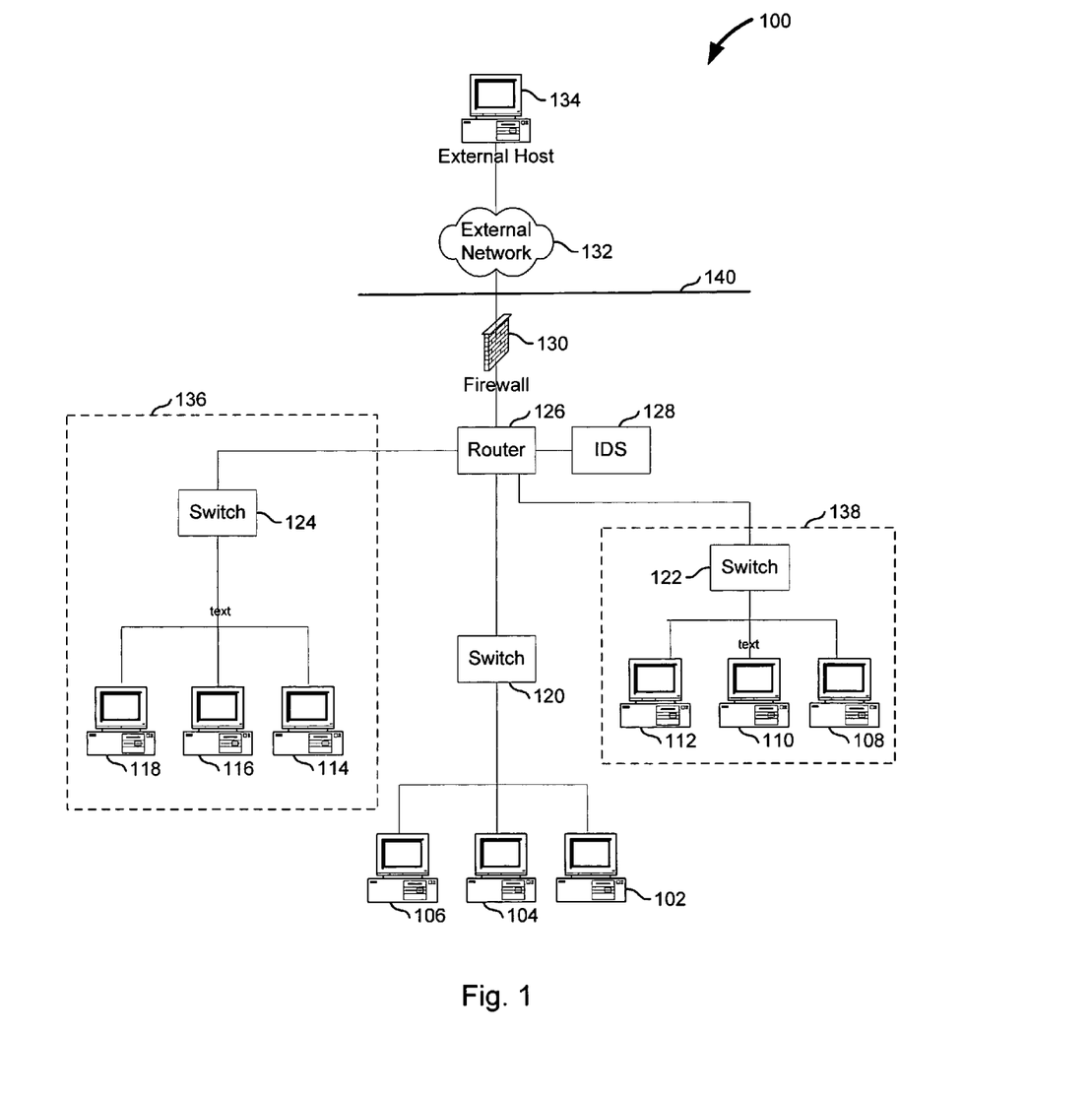
FIG. 1 is a diagram illustrating a modern switch and router network architecture in which local groups of hosts have a direct physical connection to a switch (or other device) that is connected to a router.

FIG. 1 is a diagram illustrating a modern switch and router network architecture in which local groups of hosts have a direct physical connection to a switch (or other device) that is connected to a router. Switch 120, for example, processes local traffic among hosts 102-106 and router 126 handles traffic bound for hosts, such as host 134, outside the "local" area or a host associated with switch 122 or switch 124. Incoming external traffic, such as traffic from external network 132, passes through or is inspected by typical network security appliances, such as firewall 130 and IDS 128. In the example shown, the local area means a physically proximate set of machines. In some embodiments, local means a virtual group, such as a vlan of desktop hosts at a given site. Many networks, including the enterprise network contained underneath line 140 in the example shown in FIG. 1, comprise multiple local switched networks, such as contained in box 136 (including switch 124 and hosts 114-118) and box 138 (including switch 122 and hosts 108-112). In some networks, local groups may also span multiple switches.

When a spreading threat infects a host, such as host 102, it usually attempts to propagate to other hosts very quickly. The hosts that the spreading threat attempts to infect next, and in what order, depend largely on the design of the particular spreading threat. Some spreading threats randomly choose targets from the entire network, such as network 100. However, many spreading threats attempt to propagate to nearby hosts, such as hosts 104 and 106 first. In either case, if the infected host can be prevented from contacting other hosts, the spread of the infection can be slowed. Whether the spread can be contained depends on how fast the threat expands and how fast an isolation zone can be created. The first factor depends largely on the nature of the threat. Threats exploiting common vulnerabilities and employing reasonably crafted propagation algorithms can easily propagate faster than humans can react. The second factor depends on how quickly quarantine decisions can be made, how fast they can be implemented, and how large they are in scope.

Figure 2:
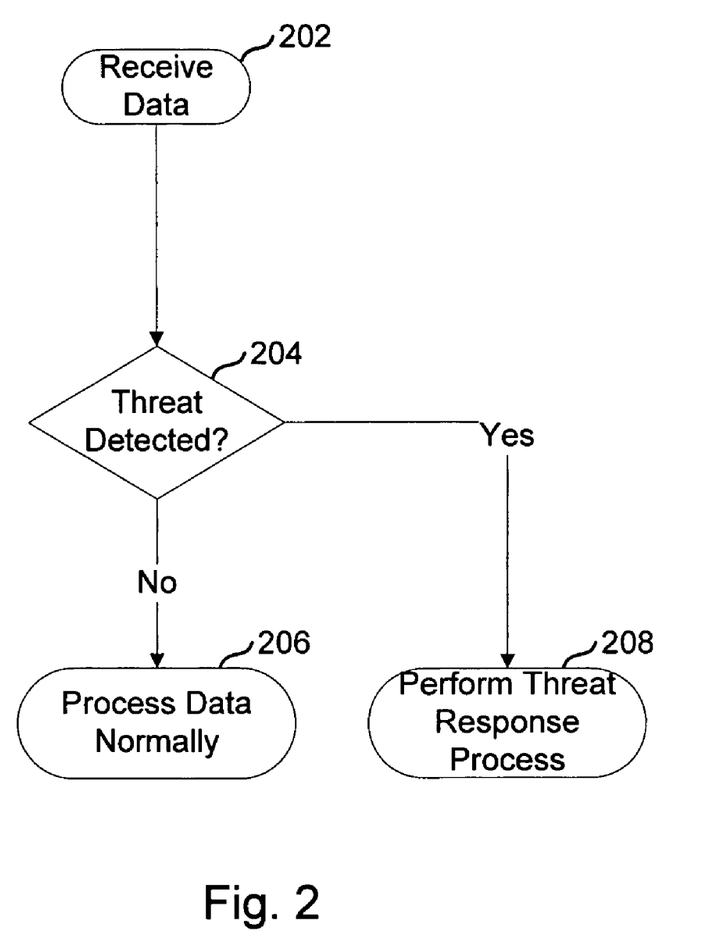
FIG. 2 is a flow diagram of a process used in one embodiment to detect and respond to a threat.

FIG. 2 is a flow diagram of a process used in one embodiment to detect and respond to a threat. In one embodiment, the process of FIG. 2 is implemented on a switch or other local network device, such as switch 120 of FIG. 1. The process begins when network traffic is received at 202. In one embodiment, the traffic received at 202 comprises outbound network traffic being sent by a host having a direct physical connection to a switch or other device on which the process of FIG. 2 has been implemented. Threat detection processing is performed on the data at 204. If no threat is detected, the data is processed normally at 206. Otherwise, a threat response process is performed at 208. The particular threat detection processing performed can vary depending on such factors as the platform used and the amount of resources available to perform detection, as well as the threat environment, the criticality of the systems and/or data being protected, etc. A typical switch may not have sufficient processing power to perform full threat detection at the level, for example, that might be performed by a firewall, IDS, or similar security system. However, many modern switches have advanced capabilities, including the ability to perform limited analysis of packet contents, IP header information, etc. Specific threat detection procedures are discussed in greater detail below.

Figure 3:
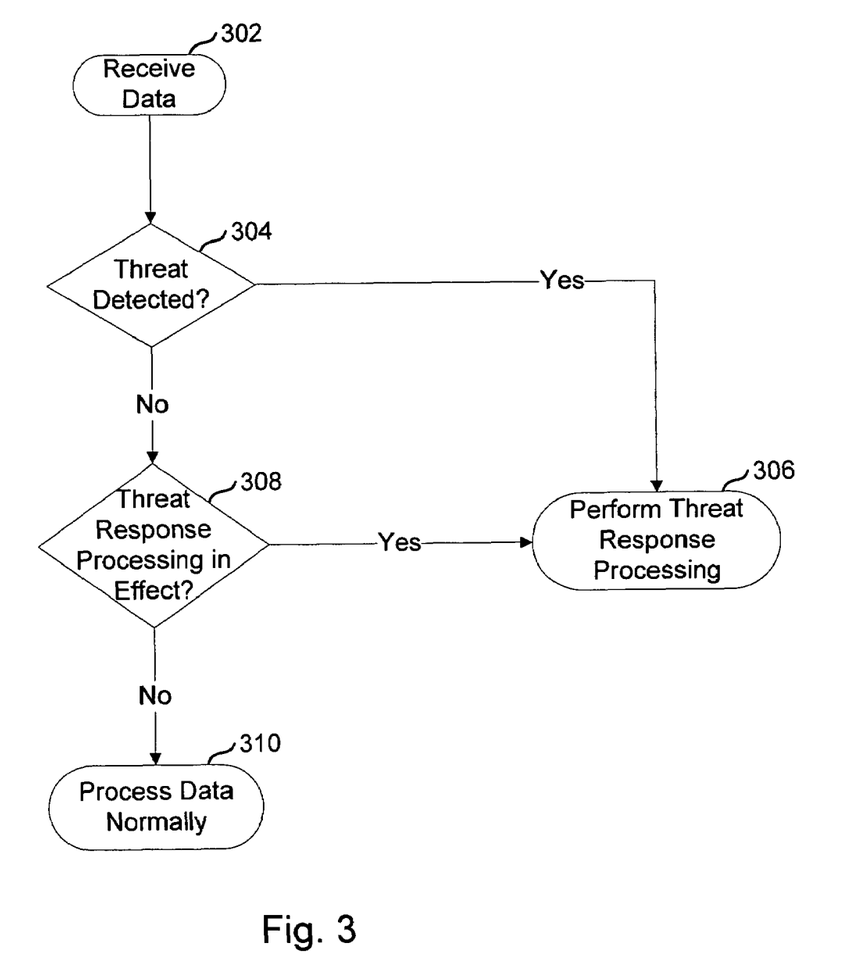
FIG. 3 is a flow diagram of a process used in one embodiment to detect and respond to a threat.

FIG. 3 is a flow diagram of a process used in one embodiment to detect and respond to a threat. The process begins when network traffic is received at 302. Threat detection processing is performed on the data at 304. If a threat is detected, a threat response process is performed at 306. It is determined at 308 whether threat response processing applicable to the received data is in effect, e.g., whether a physical switch port on which the data was received is in a blocked state due to a spreading threat detecting previously as being propagated by a host associated with the port. If a previously detected threat resulted in threat response processing being performed at 306 and such processing comprises continuing processing, such as blocking a switch port, the determination at 308 may include determining whether the threat condition that caused the threat response state to be entered has cleared, e.g., based on passage of a prescribed interval of time, or by remote intervention, such as by an administrator sending a notification that the threat condition has been cleared. If threat response processing applicable to the data received at 302 is in effect the threat response processing (e.g., blocking) is performed at 306. Threat response processing is described more fully below but in one embodiment received data may be discarded, quarantined, or otherwise routed as appropriate. If no new threat is detected (304) and threat response processing is not otherwise in effect for the received data (308), the received data is processed normally at 310.

Figure 4:
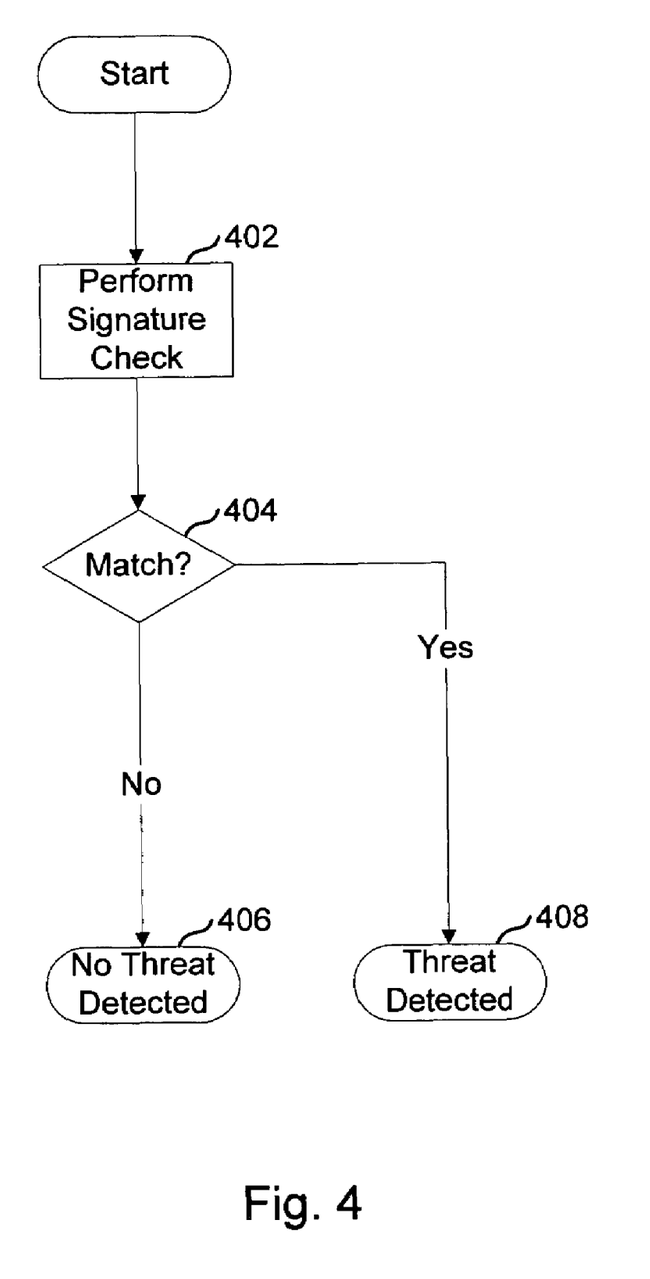
FIG. 4 is a flow diagram of a process used in one embodiment to detect a threat.

FIG. 4 is a flow diagram of a process used in one embodiment to detect a threat. The process of FIG. 4 can be used to implement the threat detection process depicted in FIG. 2 at 204 and FIG. 3 at 304. The process begins at 402 when a signature check is performed on data. Signature matching is one common way of detecting threats in data. At the simplest level, signature matching generally works by inspecting headers, payloads, or a combination thereof, and looking for specific values. For example, when an email is received, its subject can be compared against a list of subjects associated with virus-laden email. Similarly, attachments can be examined and their file names compared against the names of known-bad attachments.

Certain header values are abnormal and routinely used in exploits. For example, a TCP packet can have both the SYN and FIN flags set, in violation of RFC 793. This technique is often employed because applications, assuming that RFCs will be complied with, do not have proper exception detection or handling and can easily be exploited. Another example of a suspect packet is one in which the acknowledgment number has a non-zero value but the ACK flag is not set. When an ACK flag is not set, the acknowledgment number should be set to 0. In addition to checking for illegal header values, checking for legal but suspicious values may also be employed. For example, activity on port 31337 may indicate a Trojan.

More sophisticated signature checks can also be performed. For example, payloads can be examined for exploit shellcode and DNS buffer overflow attempts can be detected by examining the lengths of DNS fields. If a match is found (404), it is concluded that a threat has been detected (408). If no match is found, it is concluded that no threat has been detected (406). There are at least two reasons that a threat might not be detected. The first is that the data is "clean" and does not contain a threat. The second is that the data is, in fact, harmful, but no signatures exist to help identify it as a threat or a signature may exist but the system or device on which the process of FIG. 4 is implemented may not be configured to check the signature, e.g., because checking the particular signature would require processing or other resources beyond those available on the system or device on which the process of FIG. 4 has been implemented. For example, it may not be possible or desirable to configure a switch to perform full content signature matching on every packet received from a local host. To do so would require that the switch be configured to decode packets, maintain state, and be protocol aware to a degree far beyond that needed to perform the basic switching functions of a switch, which would impact system performance and/or require much more complicated and expensive switches.

In some embodiments, modified signature checking is performed. For example, instead of decoding packets in their entirety and checking the entire packet for the presence of a signature associated with a known threat, only the first portion of the packet is decoded, e.g., the "leading edge" of the packet, and that portion checked for the corresponding initial portion of the signature. Such quick checks and/or other shortcuts may enable a switch to perform an initial or first cut analysis with possibly less fidelity than a full signature check performed by a firewall, IDS, or like security system, but with less impact on the performance or cost of a local network switching/routing device, such as switch 120 of FIG. 1.

In some embodiments, protocol analysis is employed instead of or in addition to the signature check performed at 402. Protocol analysis can be used to detect both known and unknown attacks. Protocol analysis works by understanding how assorted protocols should work, and verifying that traffic conforms to the behavior expected of that protocol. By looking for anomalies within traffic, rather than checking for specific signatures, protocol analysis-based protection can also potentially provide better protection against attacks, such as spreading threats, because subtle changes to exploit code and other obfuscation techniques are less likely to succeed.

Figure 5:
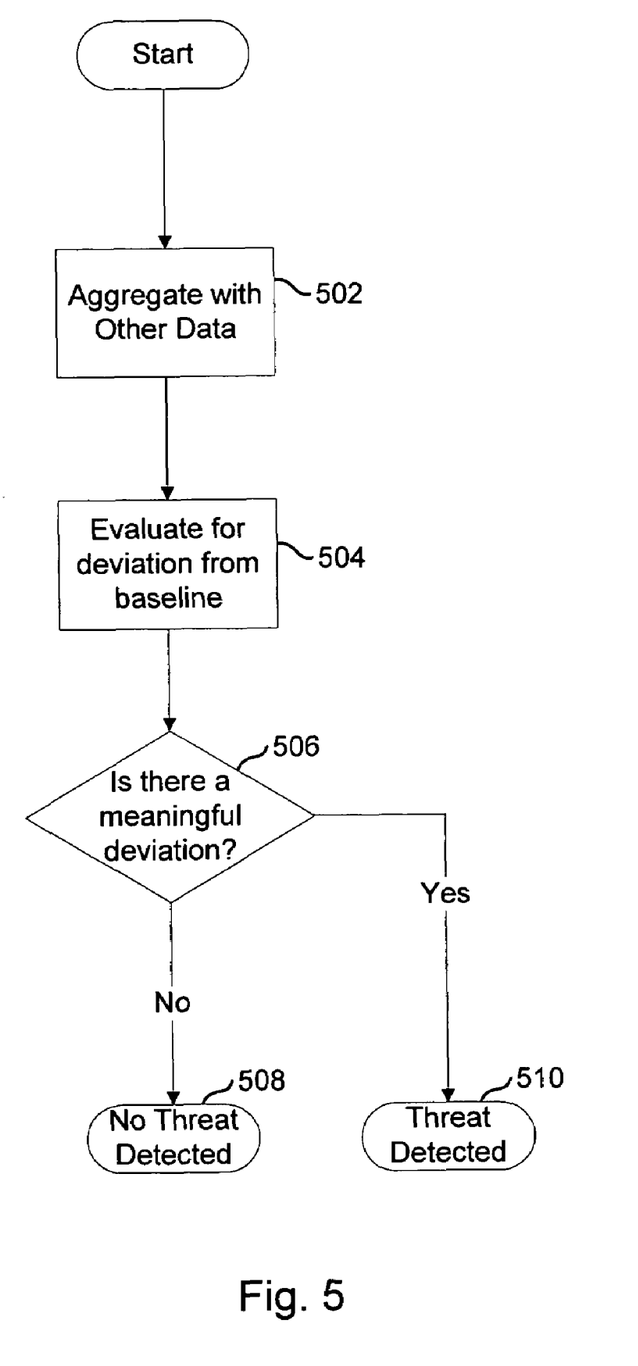
FIG. 5 is a flow diagram of a process used in one embodiment to detect a threat through statistical analysis.

FIG. 5 is a flow diagram of a process used in one embodiment to detect a threat through statistical analysis. The process of FIG. 5 can be used as the threat detection process depicted in FIG. 2 at 204 and FIG. 3 at 304. It can also be combined with the process of FIG. 4 to detect threats for which no signatures exist. Statistical information and other data can be collected about traffic as it flows through a network. For example, source IP address, source port, destination port, and type of service can be recorded. This statistical information can be aggregated, such as at 502, to form a baseline of expected, or reasonable traffic. At 504, incoming traffic is analyzed and compared against the baseline. At 506, it is determined whether the incoming traffic deviates in a meaningful way from the baseline. Analysis can be performed a number of ways. One possible indication that traffic is anomalous is a spike in traffic, for example on a specific port, especially a port that is typically used infrequently. Activity across several ports simultaneously can also signal a problem, especially across ports that are infrequently used. As worms typically require a fixed source port or set of source ports, such anomalies can indicate a worm. The infamous Slammer worm was contained within a single 404-byte user datagram protocol packet (UDP). Thus, for example, if a sudden spike in UDP traffic is noticed (504), it is determined at 506 that a meaningful deviation has been found and it is concluded at 510 that a threat has been detected. If no meaningful deviation is found at 506, it is concluded at 508 that no threat has been detected.

Another example of where statistical analysis can be employed is a denial of service attack, such as where POP3 servers are attacked by being sent the same command hundreds or thousands of times from infected hosts. The baseline at 502 may contain a ceiling threshold of expected POP3 traffic. If a particular host exceeds that threshold, especially by a significant amount, a threat can be detected at 510. The particular implementation of the process depicted in FIG. 5 can vary and the specific techniques implemented can depend on different platforms as appropriate.

In some embodiments, the aggregate data is purely local, such as by being generated exclusively from traffic previously examined. In some embodiments, as discussed more fully in conjunction with FIG. 7, the data is collected at least in part from an external source.

Normal, benign traffic may sometimes be falsely detected as a threat, such as at 408 or 510. This can happen if legitimate traffic happens to use the same port number as threatening traffic. A method for mitigating false positives is discussed more fully in conjunction with FIG. 8.

Figure 6:
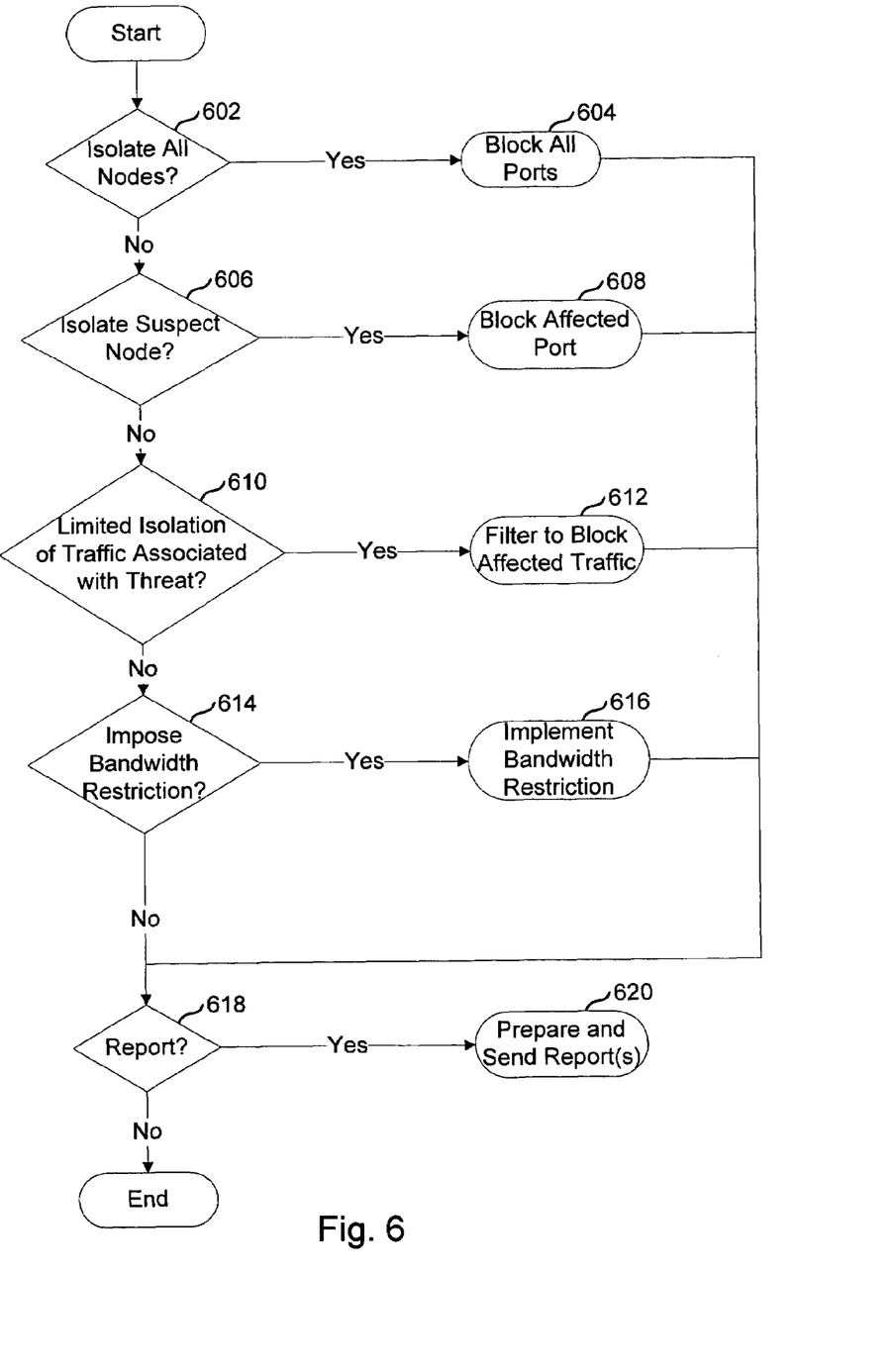
FIG. 6 is a flow diagram of a process used in an embodiment to respond to a threat.

FIG. 6 is a flow diagram of a process used in an embodiment to respond to a threat. In one embodiment, the process of FIG. 6 is used to implement 208 of FIG. 2 and/or 306 of FIG. 3. The traditional response to a spreading threat is highly manual and often includes the physical disconnection of an infected host from a network, either by pulling a network cable, or by powering off the host. The same practical effect can be achieved, however, by implementing the process of FIG. 6 on a network device, such as a switch. Additionally, particular desired responses can be tailored for particular threats with much finer granularity than can be achieved by pulling out a network cable or powering off a suspect host. As discussed more fully below, in each of the following cases, threat responses can optionally be imposed for a fixed period of time, such as 5 minutes or one hour, or until some action is taken, such as by an administrator re-enabling access through an administrative interface.

When a threat is detected, at 602 all nodes on a switch can be optionally isolated by blocking all physical ports at 604. This may be especially useful when a threat is detected within a critical infrastructure, such as a group of financial servers, or when a threat is detected within a sub-network that can be isolated without unacceptable consequences in order to protect other, as yet unaffected sub-networks that might otherwise become infected if the affected sub-network were not quarantined promptly, which may be especially desirable if the as yet unaffected sub-network contains critical data and/or performs critical functions and undesirable adverse consequences would flow from protecting the as yet unaffected sub-network through other measures, such as isolating the critical sub-network. In one embodiment, the determination made at 602 is based at least in part on policies defined by a system administrator that determine whether all local nodes should be isolated in response to a particular detected threat. For example, such a determination may be made based on such factors as the nature of the threat (e.g., how quickly threats of the type detected spread to other systems, and by what mechanism), a priority or threat level associated with the threat, the criticality of the local hosts served by the network device on which the process of FIG. 6 is implemented and the consequences of isolating those nodes from the network, and/or the importance of other sub-networks, components, etc. that might become infected if the detected threat is not quarantined aggressively. For example, a typical worm self-propagates relatively quickly, so aggressively isolating all local hosts from the network when a worm is detecting in outgoing traffic sent by one of them may be a prudent response.

If it is determined at 602 that isolating all local nodes is not the appropriate response to the detected threat, it is determined at 606 whether the appropriate response is to block only the suspect host. If it determined at 606, e.g., by applying an applicable policy (or like pre-configured logic) such as described above, that the suspect host should be isolated, at 608 the corresponding physical port is blocked. A decision to block only the suspect host may be appropriate within groups of lower security hosts, where the detected threat is relatively harmless, and/or where other networks or sub-networks that might become infected if isolating only the host that sent the traffic in which the threat was detected proves ineffective (e.g., because the threat is present in and spread from other local hosts without detection) are not critical.

If it is determined at 606 that the suspect node will not be isolated, it is determined at 610 whether traffic associated with the detected threat should be isolated. If so, at 612 traffic is filtered as applicable. For example, if a detected threat propagates over port 137, at 612, connections to port 137 on one node, or all nodes on the switch can be blocked. Other examples include blocking DNS lookups, or FTP commands.

If it is determined at 610 that isolating traffic associated with the threat is not the indicated response, a determination is made at 614 as to whether the appropriate response is to impose a general bandwidth restriction. If so, the restriction is imposed at 616. A decision to throttle bandwidth may be appropriate in cases of sudden traffic spikes that are otherwise unsuspicious, such as a burst of traffic over port 80. Such activity may signal a denial of service attack. However, it may also be a false positive triggered by behavior such as a user downloading a large file, or a webserver receiving an increase in traffic soon after a press release is published. By throttling traffic, the potential harm of a denial of service attack can be mitigated, at least in part, while still allowing a legitimate user or users to continue to use the suspect host.

In some embodiments, a determination may be made at 618 to submit a report to one or more external entities. This determination may be made after each case (604, 608, 612, 616), or it may be made absent any other threat response. The external entity(ies) can either be pre-configured, or determined through a subscription model. In some cases, the external entity comprises a peer—a similar or identical network device, such as another switch. Reporting to a peer can potentially significantly reduce the reaction time of responding to a spreading threat where a difference of minutes—much less hours—can be significant. In some cases, the external entity comprises another enforcement device, such as a firewall or an IDS. In some cases, the external entity comprises an administrator or an administration platform. If it is determined that a report should be submitted, the report is prepared and sent at 620; otherwise, the process ends. The contents and the formatting of the report may depend on a variety of factors, including the type of threat detection processing performed, the intended recipient of the report, available resources, and the platforms upon which the detection and the recipients reside.

One potential report could include a list of suspect source IP addresses with a suggestion that they be blocked. Another report could include a portion of suspect data (a "fingerprint"), with a suggestion that if the fingerprint is seen, all activity on all connected physical ports should be blocked. A third report could contain, without recommendations, aggregated data about the traffic recently seen for inclusion with other data, such as part of the process of FIG. 5 at 502. Another report may contain a suspect header, with instructions to notify a particular entity if the header is seen.

Figure 7:
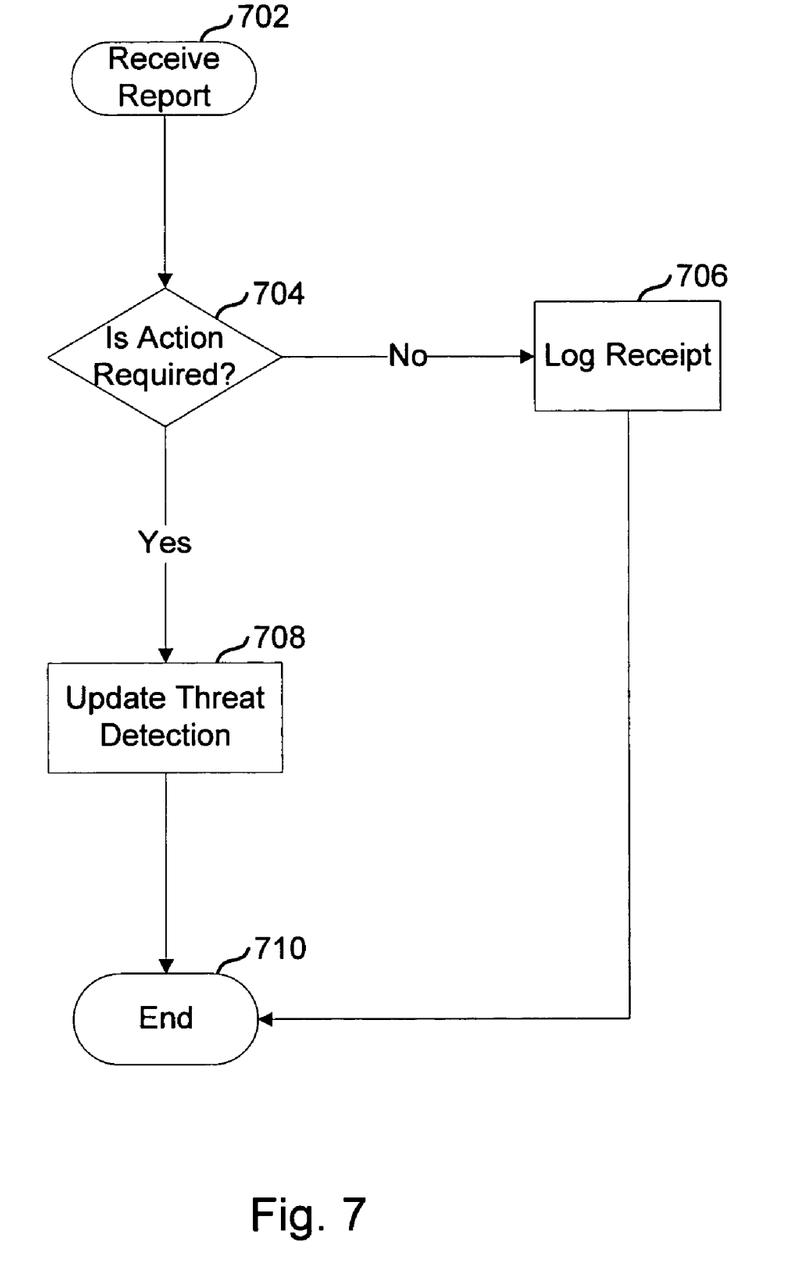
FIG. 7 is a flow diagram of a process used in one embodiment to process a received report.

FIG. 7 is a flow diagram of a process used in one embodiment to process a received report. The process begins at 702 when a report is received, such as by switch 124 from switch 120. Reports may also be received from external devices, such as IDS 128, or from an administrator. The report is examined at 704 to determine whether action is required. For example, if the report contains information that external host 134 is suspicious and external host 134 was not previously identified as suspect by switch 124, the threat detection procedures on switch 124 are updated at 708 to include the new information. Switch 124 might also choose to increase its sensitivity to particular threats for a period of time, or enter a more aggressive blocking mode. If the report contains a fingerprint of the threat, switch 124 might use this information as a signature to block based upon. Alternatively, a decision may be made at 704 not to take any action. This may be the case if the report is redundant, such as by containing a suggestion to block a source address that is already blocked. This may also be the case if, for example, switch 124 has a different policy toward the type of threat reported by switch 120.

By providing the ability to make independent policy decisions as to how to respond to externally reported threats, rather than following a blanket, centralized order, an equilibrium can be better achieved between the security needs of high-security nodes (which may fail-safe when confronted with a report of suspicious activity) and the usability requirements of low-security workstations (which may prefer to maintain connectivity absent a critical problem). For example, box 138 may represent a corporate financial network while box 136 represents a group of guest terminals in the lobby of a corporate building. A threat detected on host 102 may pose more of a threat to host 112 on the corporate financial network than to host 114 on the guest terminal. Accordingly, switches 122 and 124 may choose to take different responses to the same externally reported threat. For example, when confronted with a report that recent increased activity may indicate a worm, switch 122 may choose to isolate all nodes (602), while switch 124 may choose to impose a bandwidth restriction (614). The difference in policies could be the result of a desire to prevent as much harm as possible to a credit card processing server, while simultaneously wanting users to be able to continue using the network as long as possible without risking infection of other network nodes. Similarly, different policies may be applied to threats detected in traffic received from a local host, as described above.

In some cases, no action may be required. This may occur, for example, when switch 120 sends out aggregate information on the traffic it has recently seen. This may also occur if the report contains data irrelevant to the recipient. This might occur, for example, where a report contains information about types of traffic unsupported by the recipient. If it is determined at 704 that no action is required, receipt of the report is optionally logged at 706. In some cases, a switch may have a policy to act on a perceived threat only after a threshold number of reports about that threat. For example, switch 122 may only block traffic on port 80 after receiving 2 independent reports of suspicious activity—one from switch 124 and one from switch 120. Once receipt of the report has been logged (706) or threat detection updated (708), as applicable, the process ends (710).

By having each participant (such as switch 120, 122, and 124) in a peer reporting system such as that depicted in FIGS. 6 and 7 monitor its own traffic, distributing learning can take place, potentially reducing the amount of time needed to detect threats such as spreading threats. In comparison, in a centralized system, increased activity along a suspect port may escape detection until that activity is seen in multiple locations. An administrator may be required to initiate the push of a security alert, further increasing the amount of time before a response can be made against a spreading threat. Peer reporting can help mitigate these situations.

Figure 8:
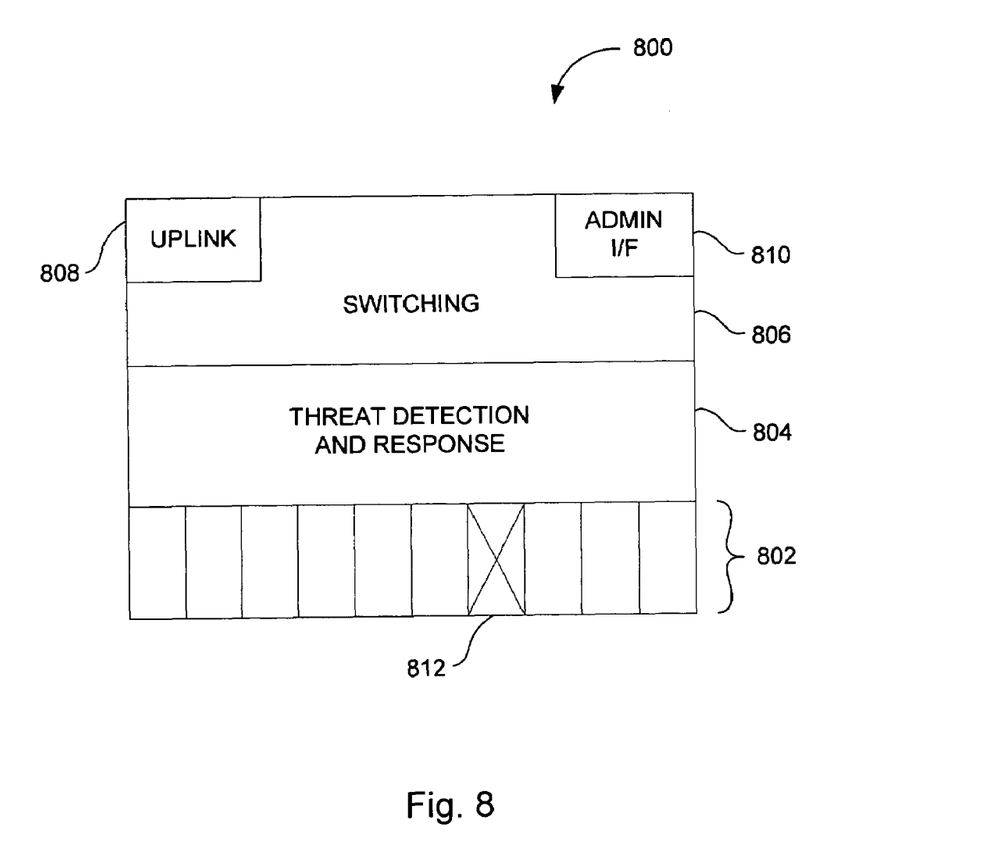
FIG. 8 is a block diagram of one embodiment of a switch implementing automatic threat detection and response procedures.

FIG. 8 is a block diagram of one embodiment of a switch implementing automatic threat detection and response procedures. Some modern switches are capable of performing statistical analysis and IP-based enforcement in addition to decoding and routing packets.

A switch often represents the edge of a trusted network or sub-network, providing an administrator with the closest controlled layer to end hosts. A switch also provides a fine-grained ability to control packets and to exert control over single nodes at a time. By being as close as possible to the individual nodes, damage can be limited more precisely, e.g., by detecting and quarantining spreading threats at a local level. Additionally, by implementing automatic threat detection and response features on a switch, the time to react is reduced.

If automatic restrictions, such as those depicted in FIG. 6 were implemented in a router, it is possible that large portions of a network would be shut off unnecessarily in response to a detected threat. Implementation on a switch allows segmentation of one zone without affecting another. For example, a desktop LAN (or an individual host associated with the LAN) can be isolated without affecting a server LAN (or other hosts on the desktop LAN). Conversely, if the restrictions are placed at the end nodes, such as via desktop software, those restrictions may be circumvented, either by interfering with the software, or by inserting devices that do not have such restrictions into the network, such as by adding a rouge laptop or access point. In addition, implementing security measures at the individual desktop level may affect desktop workstation performance adversely. It may add as well to the cost of configuring and maintaining desktop workstations, and it may not be practical to keep threat definitions up to date on every desktop workstation.

In the example shown in FIG. 8, a switch 800 has plurality of physical switch ports 802, each configured to be connected physically, e.g., by a cable or other connector, to one or more local hosts. A threat detection and response layer 804 is interposed between the ports 802 and the switching function 806 of the switch 800. In some embodiments, switching function 806 is interposed between the ports 802 and threat detection and response layer 804. The threat detection and response layer processes packets received from local hosts connected to the ports 802 and determines whether a threat is present, e.g., as described above in connection with FIGS. 2-5. Threat detection and response layer 804 is further configured to implement threat response processing, such as by blocking one or more of ports 802, restricting traffic associated with a detected threat (e.g., dropping packets received via the ports 802 that are associated with a previously detected and/or reported threat), and imposing a bandwidth restriction on one or more of the ports 802. Packets processed by threat detection and response layer 804 that are to be processed normally (e.g., no threat detected and not blocked as part of a continuing threat response) are passed to switching function 806, which routes each packet as appropriate. For example, packets addressed to another local host may be switched directly to the physical port associated with the destination and packets addressed to remote destinations may be forwarded via an uplink 808 to a downstream network node configured to further process and route the packet. The threat detection and response capabilities of threat detection and response layer 804 can either be implemented via software, firmware, hardware (e.g., an application specific integrated circuit, programmable logic device, etc.), or otherwise.

In response to a detected threat, switch 800 may be configured (e.g., through threat detection and response layer 804) to block one or more of the ports 802. In the example shown, the threat detection and response layer 804 has detected a threat in traffic received from a local host associated with port 812 and has in response blocked all traffic from port 812. Such blocking isolates the local host that sent the offending traffic thereby protecting the remaining local hosts and remote hosts accessible via uplink 808 from being infected by the host associated with port 812. This enables administrators to remove the threat from the host associated with port 812 so that the port can be unblocked and the host restored to network connectivity once it no longer presents a threat to infect other hosts. Switch 800 can also optionally suspend activity between uplink 802, thus isolating all of its ports from sending or receiving any outside traffic. Such a response may be appropriate if a quick-spreading threat, such as a worm, is detected and it is important that other as yet uninfected networks or sub-networks not be exposed to being infected by any host associated with the switch with which the host that sent the traffic in which the threat was detected is associated.

Switch 800 optionally contains an administrative interface 810 that can be used for a variety of tasks, such as enabling and disabling nodes in response to a command entered at a local or remote administrative console, pushing and receiving reports, and setting and polling threat detection and related policies. For example, an administrator may use administrative interface 810 to initiate investigation and cleanup procedures, and to notify the switch to deactivate quarantining behavior once a threat is cleared. An administrator may also use administrative interface 810 to re-enable features on switch 800 in the event a false positive is detected—for example, by whitelisting traffic from a particular source for a period of time after the switch has improperly quarantined that traffic as suspicious. In some cases, false positives may also be mitigated at an administrative workstation by an administrator reviewing reports, such as those generated at 620 in FIG. 6, and pushing updated detection rules, or policies, including whitelists, to participants.

Figure 9:
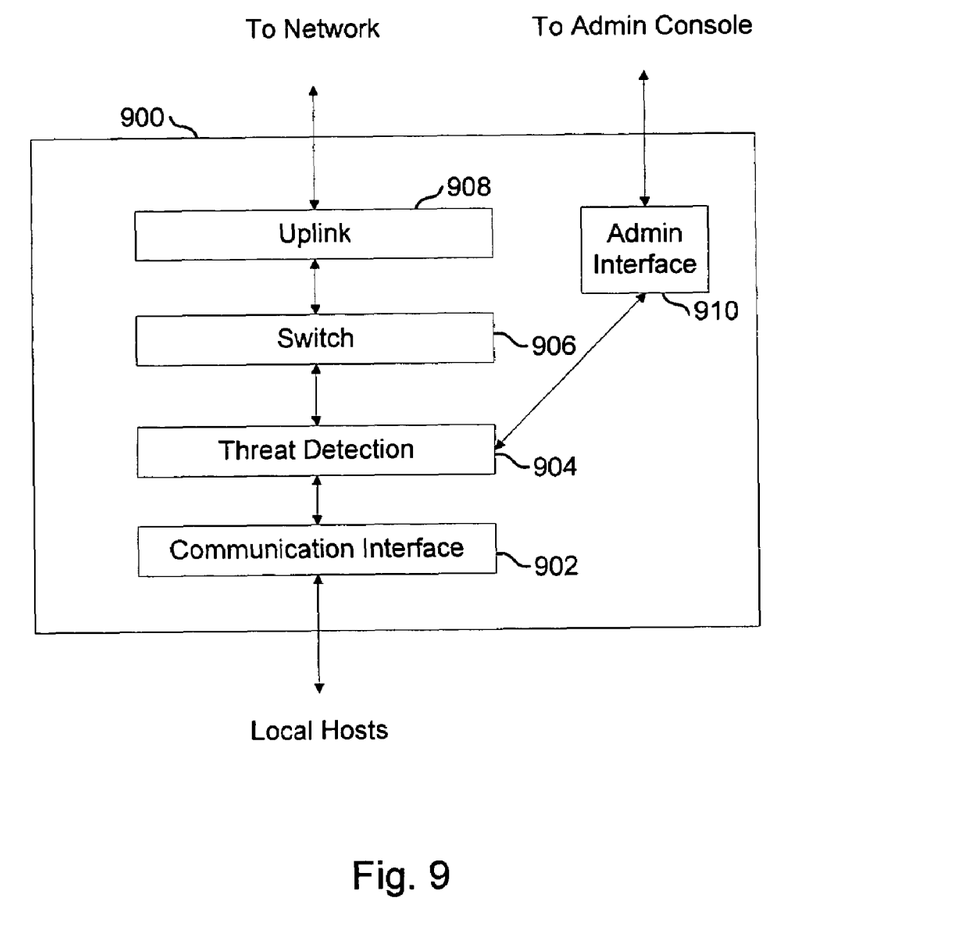
FIG. 9 is a block diagram of one embodiment of a device implementing automatic threat detection and response procedures.

FIG. 9 is a block diagram of one embodiment of a device implementing automatic threat detection and response procedures. Device 900 is connected via a communications interface 902 to one or more local hosts. In one embodiment, device 900 is a switch and communications interface 902 comprises one or more physical switch ports. Network traffic received from the local hosts is passed by communications interface 902 to a threat detection and response layer 904. Traffic in which no threat is detected and which is not blocked by an applicable threat response process is passed to a switching function 906, which routes the traffic directly to its destination (for local traffic) or via an uplink 908 to a downstream network node for further processing and routing (for traffic to remote destinations). An administrative interface 910 facilitates administrative functions, such as those described above. In one embodiment, communications interface 902 and threat detection and response layer 904 comprise a separate device or system integrated with or connected to device 900.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for mitigating network security threats comprising:
   monitoring, at a network switch or router, traffic received from a local source via a physical port of the network switch or router, wherein the local source is connected directly by a physical connector to the physical port; and
   automatically restricting traffic associated with the physical port, without human or other intervention from a source external to the network switch or router, if a threat is detected;
   wherein automatically restricting traffic associated with the physical port includes one or more of isolating the physical port, isolating a plurality of physical ports, filtering traffic associated with a particular protocol, filtering traffic associated with a particular logical port, and imposing a bandwidth restriction.

2. The method of claim 1 wherein said monitoring includes one or more of performing a signature check on the traffic, applying statistical analysis to the traffic, performing protocol analysis on the traffic, and aggregating information about the traffic with information about traffic from an outside source.

3. The method of claim 1 further comprising issuing a report to an external entity if a threat is detected.

4. The method of claim 1 further comprising issuing, in the event a threat is detected, a report to an external entity that is a peer of the reporting entity.

5. The method of claim 1 further comprising providing to an external entity a portion of traffic suspected to contain a threat.

6. The method of claim 1 further comprising receiving from an external entity a report of a threat detected by or reported to the external entity.

7. The method of claim 1 further comprising receiving from an external entity a report of a threat detected by or reported to the external entity and adjusting said monitoring based at least in part on said report.

8. The method of claim 1 further comprising receiving from an external entity a report of a threat detected by or reported to the external entity and restricting traffic associated with the physical port based at least in part on said report.

9. The method of claim 1 further comprising ending the restriction when the threat is no longer present.

10. The method of claim 1 further comprising ending the restriction when instructed to do so.

11. A system for mitigating network security threats comprising:
- a communication interface configured to receive traffic from a local source via a physical port of the system, wherein the local source is connected directly by a physical connector to the physical port; and
- a processor configured to:
  - monitor at the system the received traffic; and
  - automatically restrict traffic associated with the physical port, without human or other intervention from a source external to the system, if a threat is detected;
- wherein said processor is configured to automatically restrict traffic associated with the physical port by doing one or more of the following: isolating the physical port, isolating a plurality of physical ports, filtering traffic associated with a particular protocol, filtering traffic associated with a particular logical port, and imposing a bandwidth restriction.

12. The system of claim 11 wherein the processor is located on a switch.

13. The system of claim 11 further comprising an administrative interface configured to enable communication with an administrator.

14. The system of claim 11 further comprising an administrative interface configured to enable an administrator to override traffic restrictions imposed by the system.

15. The system of claim 11 wherein said processor is configured to monitor the received traffic by doing one or more of the following: performing a signature check on the traffic, applying statistical analysis to the traffic, performing protocol analysis on the traffic, and aggregating information about the traffic with information about traffic from an outside source.

16. The system of claim 11 wherein the processor is further configured to issue a report to an external entity if a threat is detected.

17. The system of claim 11 wherein the processor is further configured to issue, in the event a threat is detected, a report to an external entity that is a peer of the system.

18. The system of claim 11 wherein the processor is further configured to provide to an external entity a portion of traffic suspected to contain a threat.

19. The system of claim 11 wherein the processor is further configured to receive from an external entity a report of a threat detected by or reported to the external entity.

20. The system of claim 11 wherein the processor is further configured to receive from an external entity a report of a threat detected by or reported to the external entity and adjust its monitoring of the received traffic based at least in part on said report.

21. The system of claim 11 wherein the processor is further configured to receive from an external entity a report of a threat detected by or reported to the external entity and restrict traffic associated with the physical port based at least in part on said report.

22. The system of claim 11 wherein the processor is further configured to end the restriction when the threat is no longer present.

23. The system of claim 11 wherein the processor is further configured to end the restriction when instructed to do so.

24. A computer program product for mitigating network security threats, the computer program product being embodied in a computer readable storage medium and comprising computer instructions which when executed by a computer cause the computer to perform the steps of:
- monitoring, at a network switch or router, traffic received from a local source via a physical port of the network switch or router, wherein the local source is connected directly by a physical connector to the physical port; and
- automatically restricting traffic associated with the physical port, without human or other intervention from a source external to the network switch or router, if a threat is detected;
- wherein automatically restricting traffic associated with the physical port includes one or more of isolating the physical port, isolating a plurality of physical ports, filtering traffic associated with a particular protocol, filtering traffic associated with a particular logical port, and imposing a bandwidth restriction.

25. The computer program product as recited in claim 24 wherein said monitoring includes one or more of performing a signature check on the traffic, applying statistical analysis to the traffic, performing protocol analysis on the traffic, and aggregating information about the traffic with information about traffic from an outside source.

26. The computer program product as recited in claim 24, the computer program product further comprising computer instructions for issuing a report to an external entity if a threat is detected.

27. The computer program product as recited in claim 24, the computer program product further comprising computer instructions for issuing, in the event a threat is detected, a report to an external entity that is a peer of the reporting entity.

28. The computer program product as recited in claim 24, the computer program product further comprising computer instructions for providing to an external entity a portion of traffic suspected to contain a threat.

29. The computer program product as recited in claim 24, the computer program product further comprising computer instructions for receiving from an external entity a report of a threat detected by or reported to the external entity.

30. The computer program product as recited in claim 24, the computer program product further comprising computer instructions for receiving from an external entity a report of a threat detected by or reported to the external entity and adjusting said monitoring based at least in part on said report.

31. The computer program product as recited in claim 24, the computer program product further comprising computer instructions for receiving from an external entity a report of a threat detected by or reported to the external entity and restricting traffic associated with the physical port based at least in part on said report.

32. The computer program product as recited in claim 24, the computer program product further comprising computer instructions for ending the restriction when the threat is no longer present.

33. The computer program product as recited in claim 24, the computer program product further comprising computer instructions for ending the restriction when instructed to do so.

* * * * *

UNITED STATES PATENT AND TRADEMARK OFFICE
CERTIFICATE OF CORRECTION

PATENT NO. : 7,617,533 B1
APPLICATION NO. : 11/047381
DATED : November 10, 2009
INVENTOR(S) : Brian Hernacki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Nineteenth Day of October, 2010

David J. Kappos
*Director of the United States Patent and Trademark Office*